(12) United States Patent
Agafonov et al.

(10) Patent No.: US 12,483,068 B2
(45) Date of Patent: Nov. 25, 2025

(54) POWER TRANSFER APPARATUS AND METHOD THEREFOR

(71) Applicant: KONINKLIJKE PHILIPS N.V., Eindhoven (NL)

(72) Inventors: Aleksei Agafonov, Eindhoven (NL); Wilhelmus Gerardus Maria Ettes, Leeuwarden (NL)

(73) Assignee: Koninklijke Philips N.V., Eindhoven (NL)

( * ) Notice: Subject to any disclaimer, the term of this patent is extended or adjusted under 35 U.S.C. 154(b) by 15 days.

(21) Appl. No.: 18/414,061

(22) Filed: Jan. 16, 2024

(65) Prior Publication Data

US 2024/0154462 A1 May 9, 2024

Related U.S. Application Data

(63) Continuation of application No. 17/616,715, filed as application No. PCT/EP2020/065248 on Jun. 3, 2020, now Pat. No. 11,916,403.

(30) Foreign Application Priority Data

Jun. 14, 2019 (EP) .................................... 19180286

(51) Int. Cl.
*H02J 50/12* (2016.01)
*H02J 50/40* (2016.01)
(Continued)

(52) U.S. Cl.
CPC ............ *H02J 50/12* (2016.02); *H02J 50/402* (2020.01); *H02J 50/80* (2016.02); *H02J 50/90* (2016.02)

(58) Field of Classification Search
None
See application file for complete search history.

(56) References Cited

U.S. PATENT DOCUMENTS 9,270,123 B2   2/2016   Teramoto et al.
10,090,884 B2  10/2018  Ettes et al.
(Continued)

OTHER PUBLICATIONS

International Search Report and Written Opinion from PCT/EP2020/065248 mailed Dec. 17, 2020.
Qi Specification downloaded Nov. 18, 2021.

*Primary Examiner* — Daniel Kessie

(57) ABSTRACT

A power transfer apparatus being a power transmitter (101) or power receiver (103) of a power transfer via a power transfer signal comprises a power coil (103, 107) for transferring power with a complementary power transfer coil (107, 103) being the other apparatus of the power transfer operation. A first communicator (205, 305) communicates data with the complementary power transfer apparatus using modulation of the power transfer signal. A second communicator (207, 307) communicates power transfer control data via a second communication channel that is independent of the power transfer signal and has a communication data rate at least ten times higher. A presence detector (209, 309) determines whether the complementary power transfer apparatus is present in a proximity of the power transfer coil (103, 107) in response to the first data; and a power transfer controller (201, 301) restricts the wireless power transfer from the power transmitter (101) to the power receiver (103) in response to a detection of an absence of the complementary power transfer apparatus.

17 Claims, 4 Drawing Sheets

(51) Int. Cl.
*H02J 50/80* (2016.01)
*H02J 50/90* (2016.01)

(56) References Cited

U.S. PATENT DOCUMENTS

| | | |
|---|---|---|
| 11,095,168 B2 | 8/2021 | Van Wageningen et al. |
| 2016/0087691 A1 | 3/2016 | Van Wageningen et al. |
| 2017/0163102 A1* | 6/2017 | Nago ............... H02J 50/80 |
| 2017/0346344 A1* | 11/2017 | Uchimoto ......... H02J 50/12 |
| 2018/0159371 A1 | 6/2018 | Kim |

* cited by examiner

POWER TRANSFER APPARATUS AND METHOD THEREFOR

CROSS-REFERENCE TO PRIOR APPLICATIONS

This application is a continuation of U.S. patent application Ser. No. 17/616,715 filed on Dec. 6, 2021 which is the U.S. National Phase application under 35 U.S.C. § 371 of International Application No. PCT/EP2020/065248, filed on Jun. 3, 2020, which claims the benefit of EP Patent Application No. EP 19180286.7, filed on Jun. 14, 2019. These applications are hereby incorporated by reference herein.

FIELD OF THE INVENTION

The invention relates to a wireless power transfer apparatus and a method therefor, and in particular, but not exclusively, to a wireless power transfer apparatus for a Wireless Power Consortium wireless power transfer system, such as a Qi type power transfer system.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website:
http://www.wirelesspowerconsortium.com/index.html,
where in particular the defined Specification documents can be found.

Further developments seek to introduce a range of new applications and features. For example, the Wireless Power Consortium is developing a standard based on extending the principles of Qi to apply to a range of kitchen applications and appliances, including heaters, kettles, blenders, pans, etc. The developments in particular support much higher power levels for the power transfer and are known as the Cordless Kitchen standard.

The Qi standard supports communication from the power receiver to the power transmitter thereby enabling the power receiver to provide information that may allow the power transmitter to adapt to the specific power receiver. In the current standard, a unidirectional communication link from the power receiver to the power transmitter has been defined wherein the power receiver communicates by performing load modulation of the power transfer signal transferring the power. Specifically, the loading of the power transfer signal by the power receiver is varied to provide a modulation of the power signal. The resulting changes in the electrical characteristics (e.g. variations in the current draw) can be detected and decoded (demodulated) by the power transmitter.

Thus, at the physical layer, the communication channel from power receiver to the power transmitter uses the power transfer signal as a data carrier. The power receiver modulates a load which is detected by a change in the amplitude and/or phase of the transmitter coil current or voltage. The data is formatted in bytes and packets.

More information can be found in chapter 6 of part 1 of the Qi wireless power specification (version 1.0).

Initially, Qi utilized only a unidirectional communication link but bidirectional communication links have been introduced to allow more advanced control and flexibility of the power transfer operations. Communication from the power transmitter to the power receiver may for example be achieved by modulating the power transfer signal, e.g. using amplitude, frequency, or phase modulation.

However, it has been found that communication using the power transfer signal is not always optimal. Specifically, the communication capacity and possible data rate for communication using the power transfer signal as a carrier tends to be quite limited and often it is restricted to a few hundred bits/second. The suitability of the power transfer signal for communication tends to degrade substantially with increasing power levels.

A number of wireless power transfer systems have been proposed for higher power levels. For example, the Wireless Power Consortium is developing a standard based on extending the principles of Qi to apply to a range of kitchen applications and appliances, including heaters, kettles, blenders, pans, etc. The developments in particular support much higher power levels for the power transfer and are known as the Cordless Kitchen standard.

In most such higher power level power transfer systems, it has been proposed to use a separate communication system which is independent of the power transfer signal, and thus which specifically does not use the power transfer signal as a carrier for the communication link.

Such separate communication systems can typically provide a substantially higher data rate and may often provide more reliable communication. This may allow improved and more reliable power transfer in most practical applications.

However, whereas the use of a separate communication system may provide many advantages, the Inventors have realized that it may also in some scenarios result in less than optimal operation, and that it specifically may in some scenarios result in potential error situations when a power receiver is moved, removed, or replaced.

Hence, an improved power transfer approach would be advantageous, and in particular, an approach allowing increased flexibility, reduced cost, reduced complexity, enhanced user experience, additional or improved functions or services, more reliable operation, improved error detection, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transfer apparatus for wireless power transfer from a power transmitter to a power receiver, the power transfer apparatus being one of the power transmitter and the power receiver, the power transfer apparatus comprising: a power transfer coil for transferring power with a complementary power transfer coil of a complementary power transfer apparatus via a power transfer signal, the complementary power transfer apparatus being the other of the power transmitter and the power receiver; a first communicator for, during power transfer, communicating first data with the complementary power transfer apparatus via a first communication channel using modulation of the power transfer signal; a second communicator for, during power transfer, communicating power transfer control data with the complementary power transfer apparatus via a second communication channel being independent of the power transfer signal, wherein a communication data rate for the second communication channel is no less than ten times higher than a communication data rate for the first communication channel; a presence detector for, during power transfer, determining whether the complementary power transfer apparatus is present in a proximity of the power transfer coil in response to the first data; and a power transfer controller arranged to restrict the wireless power transfer from the power transmitter to the power receiver in response to a detection of an absence of the complementary power transfer apparatus.

The invention may provide improved performance and/or operation in many wireless power transfer systems. It may provide improved operation including efficient control of the power transfer operation as well is mitigating or reducing risk of undesired or undetected error scenarios arising, e.g. if a power receiver is removed.

The presence detector may be arranged for determining whether the complementary power transfer apparatus is present or absent in a proximity of the power transfer coil in response to the first data; and may specifically be arranged to determine if a power receiver present during the initialization of the power transfer is no longer present.

The first and/or second communication channel may be bidirectional or unidirectional communication channel. A communication channel may be a communication link. The communication data rate may specifically be a maximum communication data rate and may be a communication capacity of a communication link. The communication data rate may be an average communication rate. For example, if a communication channel implements a time slotted operation, the communication data rate may be a communication data rate averaged over all time slots (including time slots in which no data is communicated).

The proximity need not be a specific or well defined proximity, i.e. typically it does not correspond to a specific well-defined predetermined distance. Rather, the power transfer apparatus and the complementary power transfer apparatus may be considered proximal if the first data meets a proximity criterion. The proximity criterion may be one that is met for lower distances but not for higher distances between the power transfer apparatus and the complementary power transfer apparatus (with the threshold not necessarily being specific or known). In many embodiments and scenarios, the apparatuses will be considered to be proximal if they are at a distance that is less than the communication range for the first communication link.

The operation, and specifically the communication of the first data and the power transfer control data, and the presence detection, may be performed during a power transfer phase. The power transfer phase may specifically be a phase during which a power transfer signal is generated for transferring power from the power transmitter to the power receiver. The power transfer phase may be a phase during which power control error messages are transmitted from the power receiver to the power transmitter. The power transmitter and power receiver may implement a power control loop for the transfer of power during the power transfer phase. The power control loop may adapt a level of the power transfer signal in response to the power control error messages.

In accordance with an optional feature of the invention, the communication data rate of the first communication channel is no more than 500 bit per second.

This may provide particularly advantageous performance in many embodiments and scenarios. It may in many embodiments allow higher power levels of the power transfer and/or may allow a relatively low frequency of the power transfer signal.

In accordance with an optional feature of the invention, the communication data rate of the first communication channel is no more than 100 bit per second.

This may provide particularly advantageous performance in many embodiments and scenarios. It may in many embodiments allow higher power levels of the power transfer and/or may allow a relatively low frequency of the power transfer signal.

In accordance with an optional feature of the invention, the first data is received from the complementary power transfer apparatus and the presence detector is arranged to determine the absence of the complementary power transfer apparatus in response to a detection that no first data meeting a criterion is received.

This may provide a particularly efficient and advantageous operation in many embodiments. It may typically provide a low complexity yet highly reliable detection of the presence or absence of the power receiver within a suitable power transfer domain for the power transmitter.

The criterion may specifically be that a given data pattern is received within a given time interval. The data pattern may be a static, possibly predetermined, or dynamic data pattern.

In accordance with an optional feature of the invention, the first data comprises an identity indication for the complementary power transfer apparatus and the proximity detector is arranged to detect the absence of the complementary power transfer apparatus in response to no identity indication meeting a criterion being received.

This may provide a particularly efficient and advantageous operation in many embodiments. The criterion may specifically be that a given identity data pattern is received within a given time interval. The data pattern may be a static, possibly predetermined, or dynamic data pattern In accordance with an optional feature of the invention, the first communicator is arranged to transmit a query message to the complementary power transfer apparatus and the proximity detector is arranged to detect the absence of the complementary power transfer apparatus in response to no first data comprising a valid response to the query message being received.

This may provide a particularly efficient and advantageous operation in many embodiments.

In accordance with an optional feature of the invention, the first data comprises control data for the power transfer.

This may provide a particularly efficient and advantageous operation in many embodiments, and may specifically provide improved control data communication.

In accordance with an optional feature of the invention, the power transfer apparatus further comprises a power controller arranged to communicate control data for the power transfer with the complementary power transfer apparatus, the power controller being arranged to communicate some control data with the complementary power transfer apparatus via the first communication channel and to communicate other control data with the complementary power transfer apparatus via the second communication channel.

This may provide a particularly efficient and advantageous operation in many embodiments, and may specifically provide improved control data communication. The approach may for example provide both high data rate control data communication and low delay control data communication by exploiting different properties of the difference communication links. The control data for the power transfer with the complementary power transfer apparatus may include control data that affects a dynamic property of the power transfer, such as a property of the power transfer signal. The property may be a level, duration, amplitude, strength, and/or frequency of the power transfer signal.

In accordance with an optional feature of the invention, the power transfer signal employs a repeating time frame comprising at least a power transfer time interval and a reduced power time interval during which a power level of the power transfer signal is reduced relative to the power transfer time interval; and wherein the first communicator (205, 305) is arranged to communicate the first data during the reduced power time intervals.

This may provide a particularly efficient and advantageous operation in many embodiments. The power transfer signal may employ a repeating time frame during a power transfer phase.

In accordance with an optional feature of the invention, the power transfer signal has a fixed non-zero amplitude in a plurality of subsequent reduced power time intervals.

This may provide a particularly efficient and advantageous operation in many embodiments.

In accordance with an optional feature of the invention, a frequency of the power transfer signal is higher during reduced power time intervals than during power transfer time intervals.

This may provide a particularly efficient and advantageous operation in many embodiments.

In accordance with an optional feature of the invention, the power transfer apparatus is the power receiver and the complementary power transfer apparatus is the power transmitter.

In accordance with an optional feature of the invention, the power transfer apparatus is the power transmitter and the complementary power transfer apparatus is the power receiver.

In accordance with an optional feature of the invention, method of operation for a power transfer apparatus for wireless power transfer from a power transmitter to a power receiver, the power transfer apparatus being one of the power transmitter and the power receiver, the method comprising: a power transfer coil transferring power with a complementary power transfer coil of a complementary power transfer apparatus via a power transfer signal, the complementary power transfer apparatus being the other of the power transmitter and the power receiver; communicating, during power transfer, first data with the complementary power transfer apparatus via a first communication channel using modulation of the power transfer signal; communicating, during power transfer, power transfer control data with the complementary power transfer apparatus via a second communication channel being independent of the power transfer signal, wherein a communication data rate for the second communication channel is no less than ten times higher than a communication data rate for the first communication channel; determining, during power transfer, whether the complementary power transfer apparatus is present in a proximity of the power transfer coil in response to the first data; and restricting the wireless power transfer from the power transmitter to the power receiver in response to a detection of an absence of the complementary power transfer apparatus.

According to an aspect of the invention there is provided power transfer system for wireless power transfer from a power transmitter to a power receiver, the power transmitter comprising: a power transmitter coil for generating a power transfer signal for transferring power to the power receiver, a first transmitter communicator for, during power transfer, communicating first data with the power receiver via a first communication channel using modulation of the power transfer signal, and a second transmitter communicator for, during power transfer, communicating power transfer control data with the complementary power transfer apparatus via a second communication channel being independent of the power transfer signal, wherein a communication data rate for the second communication channel is no less than ten times higher than a communication data rate for the first communication channel; and the power receiver comprising: a power receiver coil for receiving power via the power transfer signal, a first receiver communicator for, during power transfer, communicating the first data with the power receiver via the first communication channel, and a second receiver communicator for, during power transfer, communicating the power transfer control data with the power transmitter via the second communication channel; wherein at least one of the power transmitter and the power receiver further comprises: a presence detector for, during power transfer, determining whether the complementary power transfer apparatus is present in a proximity of the power transfer coil in response to the first data, the complementary power transfer apparatus being the other of the at least one of the power transmitter and the power receiver; and a power transfer controller arranged to restrict the wireless power transfer from the power transmitter to the power receiver in response to a detection of an absence of the complementary power transfer apparatus.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a wireless power transfer system utilizing a power transfer approach such as known from the Qi specifications. However, it will be appreciated that the invention is not limited to this application but may be applied to many other wireless power transfer systems.

Figure 1:
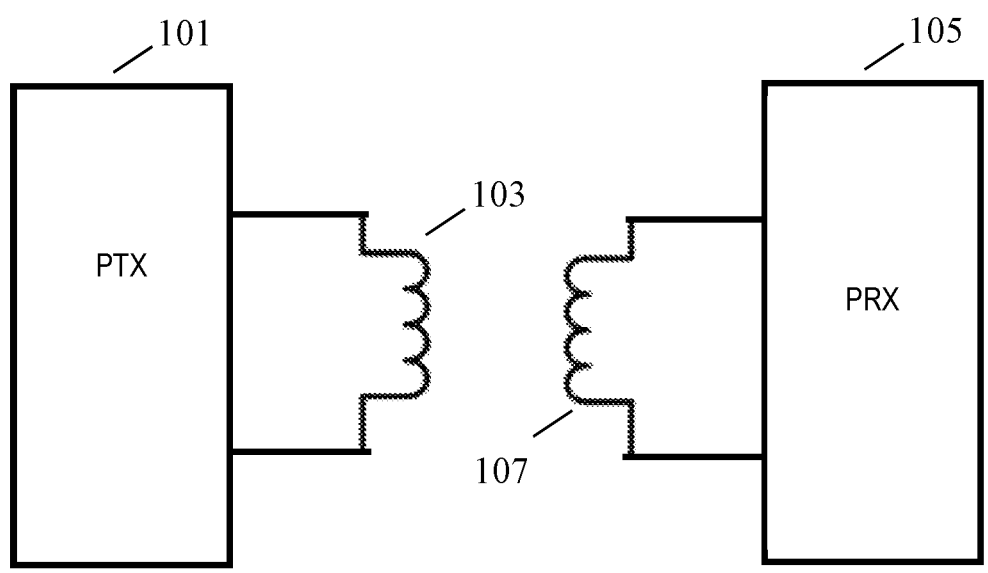
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides a wireless inductive power transfer from the power transmitter 101 to the power receiver 105. Specifically, the power transmitter 101 generates a wireless inductive power transfer signal (also referred to as a power transfer signal or an inductive power transfer signal), which is propagated as a magnetic flux by the transmitter coil or inductor 103. The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 103 and the receiver coil 107 are loosely coupled and thus the receiver coil 107 picks up (at least part of) the power transfer signal from the power transmitter 101. Thus, the power is transferred from the power transmitter 101 to the power receiver 105 via a wireless inductive coupling from the transmitter coil 103 to the receiver coil 107. The term power transfer signal is mainly used to refer to the inductive signal/magnetic field between the transmitter coil 103 and the receiver coil 107 (the magnetic flux signal), but it will be appreciated that by equivalence it may also be considered and used as a reference to an electrical signal provided to the transmitter coil 103 or picked up by the receiver coil 107.

In the example, the power receiver 105 is specifically a power receiver which receives power via receiver coil 107. However, in other embodiments, the power receiver 105 may comprise a metallic element, such as a metallic heating element, in which case the power transfer signal induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications, and in excess of 100 W and up to more than 1000 W for high power applications supported by the Cordless Kitchen standard being developed by the Wireless Power Consortium.

In the following, the operation of the power transmitter 101 and the power receiver 105 will be described with specific reference to an embodiment in accordance with the Qi Specification (except for the herein described (or consequential) modifications and enhancements) or suitable for the higher power Cordless Kitchen specification.

The system of FIG. 1 utilizes bidirectional communication to support the power transfer operation. The bidirectional communication is used to configure, establish, and control the power transfer and may include exchange of a range of control data. In particular, a communication channel between the wireless power transmitter and the wireless power receiver is considered as essential in order to establish a feedback loop from the wireless power receiver to the wireless power transmitter, which is vital for power system stability.

As an example, the current Qi specification limits the amount of power for wireless power transfer to 15 watt. Such an amount of power might be considered as a low power wireless power system. This system uses modulation of the power transmitter as a communication means between the power transmitter and the power receiver. This is also known as an in-band communication channel.

However, such communication is not ideal for all systems, and especially tends to be suboptimal for higher power levels. Specifically, for applications with higher transfer power levels, the modulation of the power transfer signal creates an additional source of losses and with increased power levels absolute values of losses also arises. These losses cause heat dissipation, e.g. in power electronic circuits of the wireless power system, or in materials within an operational range of the wireless power system.

Also, in order to provide efficient control of the power transfer, it is desirable to have a high communication data rate between the power transmitter and the power receiver. However, this is typically very difficult to achieve using the power transfer signal as a carrier signal, and in particular for higher power applications, such as kitchen applications, the achievable data rate is typically too low to support the desired functionality. Specifically, with an operational frequency of the power transfer signal in the order of 20 to 300 kHz, the bandwidth of the channel is often not sufficient for more complex operations, such as e.g. for power receiver authorization.

Accordingly, higher power level systems, such as those compatible with the Cordless Kitchen specification, tend to replace the in-band communication using the power transfer signal with an out-of-band communication channel that is implemented by a separate and typically dedicated short range communication system. This separate communication system is independent of the power transfer signal and does not use the power transfer signal as a carrier for the communication. It is often a short range communication system, such as for example a Bluetooth or an NFC communication system.

However, the Inventors have realized that there may be specific disadvantages associated with such an approach, and that these may be effectively addressed by the system of FIG. 1 implementing two communication channels between the power transmitter and the power receiver with specifically a low data rate communication link being established using the power transfer signal as a carrier, and a higher data rate communication link being established using the separate communication system. The Inventors have specifically realized that proximity detection can be implemented based on the low data rate communication channel using the power transfer signal thereby allowing a more reliable and robust operation, which specifically may reduce the risk of strong magnetic fields being generated when no (or the wrong) power receiver is present.

Specifically, wireless power transfer in the system occurs when the power receiver coil is in proximity of the wireless power transmitter coil and these coils have sufficient coupling factor to transfer energy with high efficiency. This proximity area is usually specified as a combination of the misalignment between wireless power receiver and transmitter coils and the maximal vertical distance between them. This volume is considered the wireless power operational area/volume of the wireless power system.

The Inventors have realized that in case of wireless power transfer with an established out-of-band communication channel, the communication link typically has a range which is different than the wireless power operational area/volume, and this may give rise to problems that are inherently avoided by the conventional in-band communication approach.

In the system of FIG. 1, dual parallel communication systems are implemented with one communication link/channel being an out of band communication link that is independent of the power transfer signal whereas the other communication link/channel is an in-band communication link using the power transfer signal as a carrier for modulation by the data. The in-band communication link is implemented with a low data rate whereas the out of band communication link is implemented with a high data rate. The data rate for the out-of-band communication link is no less than 10 times higher than the in-band communication link.

The out-of-band communication link is used for communication of control data which specifically may be control data supporting the power transfer signal, such as e.g. power control messages. Thus, the power transfer operation can be based on exchange of substantial amounts of data/information.

The in-band communication link is used to provide a proximity detection for the system to detect whether the power transmitter and the power receiver indeed are/remain close together. Thus, the in-band communication link may be used to detect that the power receiver and/or the power transmitter are moved such that they are not close to each other, and in response the system may proceed to e.g. terminate the power transfer.

The approach reflects the Inventors' realization that it is important to detect that the wireless power receiver is located inside the wireless power operational volume/volume. As soon as wireless power receiver leaves the wireless power operational volume, the wireless power transfer should be interrupted (e.g. stopped or reduced to low levels) in order to ensure that the large magnetic field from wireless power transmitter does not have any negative effect on other devices (e.g. it could result in undesired heating in metallic objects or potentially damage other electrical equipment, such as specifically a different power receiver being brought close to the power transmitter).

To address this issue, the system may include a proximity/presence detection technique that seeks to establish an unambiguous one-to-one relation between the wireless power receiver and the wireless power transmitter of the power transfer. Proximity/presence detection may in this context be thought of as the ability of the wireless power transmitter to detect/estimate the presence or absence of an associated wireless power receiver inside the operational volume.

In systems such as Qi where communication is based on modulation of the power transfer signal this may inherently occur as the removal of a power receiver from the power operation will result in a breakdown of communication leading to a termination of the power transfer.

However, in the case of wireless power transfer with an established out-of-band communication link where the range of the communication link is larger than the corresponding wireless power operational volume, it is possible that the power transfer continues as valid control data may still be exchanged. The system of FIG. 1 may address such scenarios as it comprises presence/proximity detection functionality to determine that the (appropriate) power receiver is located within a suitable wireless power operational volume for the power transmitter. Further, this presence/proximity detection is based on supplementing the out-of-band communication link with an in-band communication link that is specifically used to perform presence detection. Specifically, control data may be communicated at a high data rate using an out-of-band communication link with a high data rate in order to effectively support the power transfer and an in-band communication link may supplement this by communicating presence data that is used to perform presence detection. Specifically, if the right presence data is successfully communicated, it may be determined that the power transmitter and the power receiver are proximal and if the presence data is not successfully communicated, it may be determined that they are not sufficiently proximal for a presence to be detected. The presence data may typically be any data suitable for detecting the presence of a power receiver in the proximity of a power transmitter (or vice versa).

The described approach accordingly implements wireless power receiver proximity detection during wireless power transfer, and specifically during the power transfer phase. The approach may for example enable the power transmitter to detect the proximity of a power receiver and to terminate power transfer if it is detected that the power receiver has left the wireless power operational volume. For example, if a proximity detection fails during the power transfer phase, the system may terminate the power transfer. The presence/proximity detection may be based on the system utilizing the power transfer signal as a communication carrier for modulation by presence data. This may specifically closely tie together presence/proximity detection and the power transfer operation thereby resulting in more robust operation. A detection of the power receiver no longer being present may specifically result in the power transfer/power transfer phase being terminated to avoid undesired operating scenarios to be generated and specifically to avoid undesired strong electromagnetic fields to be generated when this is not required as part of a valid power transfer.

Figure 2:
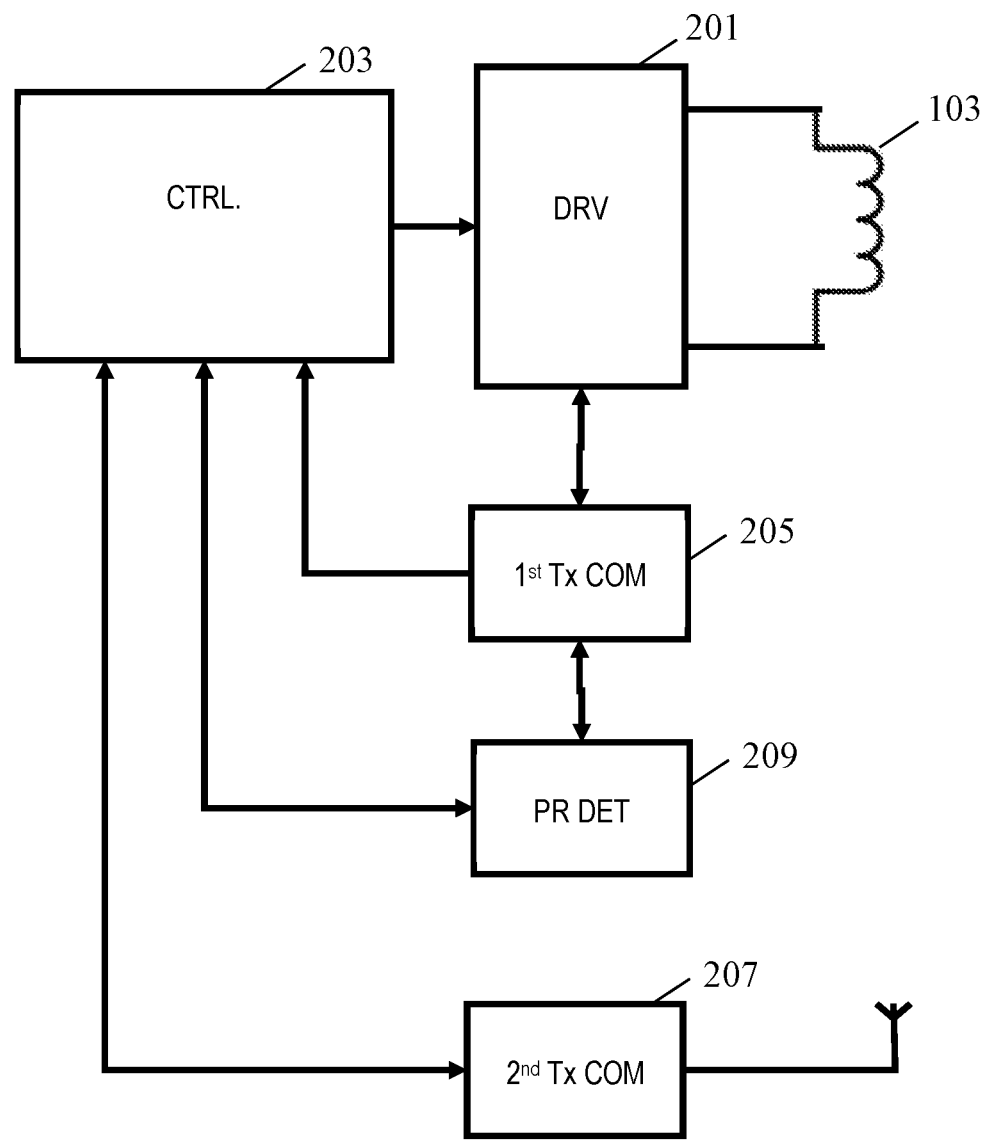
FIG. 2 illustrates an example of elements of a power transmitter in accordance with some embodiments of the invention.
Figure 3:
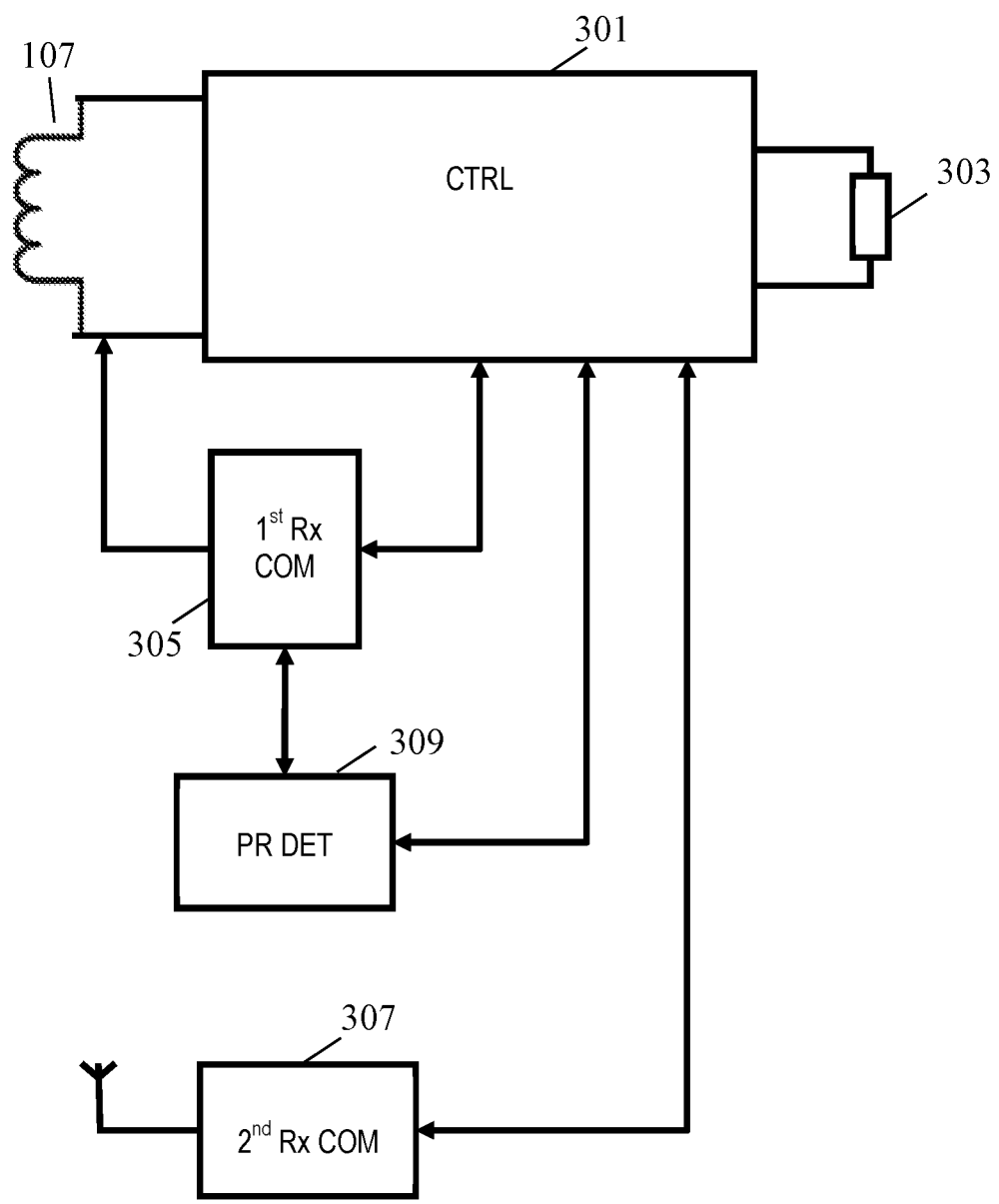
FIG. 3 illustrates an example of elements of a power receiver in accordance with some embodiments of the invention.

The approach will be described in further detail with reference to FIG. 2 which illustrates elements of the power transmitter 101 and FIG. 3 illustrates elements of the power receiver 105 of FIG. 1 in more detail.

FIG. 2 illustrates an example of elements of the power transmitter 101 of FIG. 1 in more detail. The transmitter coil 103 is coupled to a driver 201 which generates a drive signal for the transmitter coil 103. The driver 201 generates the current and voltage signal which is fed to the transmitter inductor 103. The driver 201 is typically a drive circuit in the form of an inverter which generates an alternating signal from a DC Voltage. The output of the driver 201 is typically a switch bridge generating the drive signal by the appropriate switching of switches of the switch bridge.

The driver 201 is coupled to a power transmitter controller 203 which is arranged to control the operation of the power transmitter 101. The power transmitter controller 203 may be arranged to control the operation of the power transmitter 101 to perform the required and desired functions associated with power transfer protocols of the system, and may specifically in the present example be arranged to control the power transmitter 101 to operate in accordance with the Cordless Kitchen Specifications. For example, the power transmitter controller 203 may comprise functionality for detecting a power receiver, for initiating power transfer, for supporting power transfer, for terminating power transfer etc.

In the example, the power transmitter 101 further comprises a first transmitter communicator 205 which is arranged to communicate with the power receiver 105. The first transmitter communicator 205 is arranged to communicate with the power receiver 105 using the power transfer signal as a communication carrier, i.e. it may modulate data onto the power transfer signal. The first transmitter communicator 205 is arranged to communicate with the power receiver 105 using an in-band communication link.

The power transmitter communicator 205 may typically be arranged to receive messages from the power receiver 105 by the power receiver 105 load modulating the power transfer signal as will be known to the skilled person, e.g. from the Qi power transfer specifications. The power transmitter communicator 205 may communicate messages to the power receiver e.g. by modulating the power transfer signal as will be known to the skilled person. For example, the first transmitter communicator 205 may control the driver to vary the frequency, amplitude, and/or phase of the drive signal in response to the data to be transmitted. The power transmitter controller 203 may thus transmit data to the power receiver 105 using e.g. frequency, amplitude and/or phase modulation. In many embodiments, the first transmitter communicator 205 may support bidirectional communication but it will be appreciated that in some embodiments, the communication may only be in one direction.

The power transmitter 101 further comprises a second transmitter communicator 207 which is arranged to communicate with the power receiver 105 independently of the power transfer signal. The second transmitter communicator 207 is arranged to communicate with the power receiver 105 using a communication link that uses a different communication carrier than the power transfer signal. Thus, the second transmitter communicator 207 establishes an out-of-band communication link which is independent of the power transfer signal and the data communicated via this link is not modulated onto the power transfer signal.

The exact communication approach and the communication carrier used may be different in different embodiments and may depend on the preferences and requirements of the specific application. The out-of-band communication link is typically implemented by a short-range communication system that however has a range which is substantially larger than the range of the power transfer and which substantially exceeds the wireless power transfer operational volume.

In many embodiments, the in-band communication link may be implemented by a standardized short-range communication system such as a Bluetooth or NFC communication system. Such communication systems may provide an efficient out-of-band communication link that provides a high data rate, reliable communication, and typically low-cost implementation. It may specifically enable efficient exchange of control data for the power transfer. In many embodiments, the second transmitter communicator 207 may support bidirectional communication but it will be appreciated that in some embodiments, the communication may only be in one direction.

As illustrated in FIG. 3, the receiver coil 107 of the power receiver 105 is coupled to a power receiver controller 301 which couples the receiver coil 107 to a load 303. The power receiver controller 301 includes a power control path which converts the power extracted by the receiver coil 107 into a suitable supply for the load 303. In addition, the power receiver controller 301 may include various power receiver controller functionality required to perform power transfer, and in particular functions required to perform power transfer in accordance with the Cordless Kitchen specifications.

The power receiver 105 further comprises a first receiver communicator 305 which is arranged to communicate with the first transmitter communicator 205 using the power transfer signal as a carrier. Thus, the first transmitter communicator 205 and the first receiver communicator 305 establish an in-band communication link.

The in-band communication link typically has a very low data rate. The system may specifically be suitable for high power levels of the wireless power transfer, such as e.g. above 100 W. As such high levels, the communication using the power transfer signal as a communication carrier becomes very difficult and in order to ensure reliable communication and to minimize the impact on the power transfer, the data rate must be kept relatively low.

In most embodiments, the communication data rate for the communication on the in-band communication link is no more than 1000 bit/s, 500 bit/s or even no more than 100 bit/s. This is typically suitable for high power transfer and provides a reliable communication link.

However, in most embodiments, it is insufficient to allow an optimized power transfer control. For example, control data is desired to be communicated at a higher data rate. For example, power control data may be communicated such as for example power control loop error messages that may e.g. indicate an absolute error (mismatch of expected power/current level on receiver side) or a relative error (receiver only reports if it needs more power or less).

In order to support this higher data rate communication, the power receiver 105 further comprises a second receiver communicator 307 which establishes an out-of-band communication link with the second transmitter communicator 207. The secondary resonance circuit 205 may thus be the complementary to the first transmitter communicator 205.

Thus, the power transmitter 101 and the power receiver 105 may simultaneously during the power transfer operation establish two communication links, each of which may be unidirectional (in either direction) or be bidirectional.

The two communication links typically have very different properties. Specifically, the communication data rate of the out-of-band communication link is no less than ten times higher than the communication data rate for the in-band communication link. Thus, the communication rate for the out-of-band communication link is much larger than that of the in-band communication link. However, the communications may also differ in other parameters such as communication reliability and error rate.

Further, typically the ranges for the two communication links are different, or at least are not known to be identical. In most embodiments, the out-of-band communication link will have a (much) longer range than the in-band communication link. Further, due to the fact that the in-band communication link utilizes the power transfer signal as a communication carrier, the range of the in-band communication link is in contrast to the out-of-band communication link inherently tied to the range of the power transfer.

In the system, this is utilized to provide a proximity/presence detection during the power transfer phase.

As a specific example, the power transmitter 101 comprises a transmitter presence detector 209 which is arranged to determine whether the power receiver is present or not in a proximity of the transmitter coil 103 based on data communicated over the in-band communication link.

In some embodiments, the first transmitter communicator 205 may be arranged to receive data from the power receiver 105 and it may be arranged to determine an absence (non-presence) of the power receiver 105 in response to a detection that no presence data that meets a given criterion has been/is received.

In many embodiments, the criterion may simply be that a given data pattern is received. For example, the transmitter presence detector 209 may receive data which is compared to a predetermined pattern and if they match (according to a given match criterion), it is determined that the power receiver is still present. If no data is received that matches the predetermined pattern within a given time limit, the transmitter presence detector 209 may determine that the power receiver is no longer present within the operational volume of the power transfer.

In order to support such operation, the power receiver may at regular intervals, and potentially continuously, transmit the desired predetermined pattern. For example, a continuous feedback system may be generated where the power receiver continuously transmits data and the power transmitter continuously evaluates whether such data is successfully received. If this communication feedback loop is active, it must mean that the power receiver is sufficiently close to allow reliable communication using the power transfer signal to be possible, and thus it is considered that the power receiver is present in the power transfer operational volume (i.e. it is considered to be sufficiently proximal/close). Thus, the approach may continuously determine whether the power receiver is present or absent within a proximity of the transmitter coil 103 corresponding to the communication range of the in-band communication link. As the in-band communication link is based on using the power transfer signal as a communication carrier, the communication range of the in-band communication link is inherently linked with the power transfer range and therefore the approach provides good estimation/detection of whether the power receiver is present or not within the power transfer operational volume.

The transmitter presence detector 209 is coupled to the power transmitter controller 203 which is arranged to restrict the power transfer in response to a detection of an absence of the complementary device. Thus, the transmitter presence detector 209 continuously transmits the results of the detection process to the power transmitter controller 203 and if it indicates that the power receiver is not (likely to be) in the operational volume, it may proceed to restrict the power transfer. The restriction may typically be by applying a maximum power level limit to the power transfer signal where the maximum power level is lower than a maximum power level limit of the power transfer (when no restriction is applied).

Typically, the power transmitter controller 203 is arranged to terminate the power transfer in response to a detection that the power receiver is not present (equivalent to restricting the power transfer or maximum power level limit to zero). Thus, if a power transfer is ongoing (the system is operating in the power transfer phase) and the power transfer device detects the absence of the power receiver, e.g. by determining that the expected data is not received on the in-band communication link, the power transmitter controller 203 is informed and it proceeds to terminate the power transfer thereby preventing that a strong magnetic signal is generated without a power receiver being present.

The above description focused on the scenario in which the power transmitter detects whether the power receiver is present or absent and controls the power transfer accordingly. However, it will be appreciated that in other embodiments, detection functionality may alternatively or additionally be in the power receiver. Indeed, all the comments provided above and in the following with respect to a system in which detection functionality is present in the power transmitter may also be considered to apply to the complementary situation where detection functionality is present in the power receiver (for example, references to a power transmitter detecting whether the power receiver is proximal apply mutatis mutandis to the power receiver detecting whether the power transmitter is proximal).

Specifically, the power receiver 105 may include a receiver presence detector 309 which is arranged to determine whether the power transmitter 101 is present or not in a proximity of the transmitter coil 103 based on data communicated over the in-band communication link.

In some embodiments, the first receiver communicator 305 may be arranged to receive data from the power transmitter 101 and it may be arranged to determine an absence of the power transmitter 101 in response to a detection that no presence data meeting a given criterion is received.

As described for the complementary scenario, the criterion may simply be that a given data pattern is received. For example, the receiver presence detector 309 may receive data transmitted from the first transmitter communicator 205 by e.g. AM, FM or PM modulation of the power transfer signal and this may be compared to a predetermined pattern. If they match (according to a given match criterion), it is determined that the power transmitter 101 is still present, and thus that reliable power transfer is feasible. If no data is received within a given threshold that matches the predetermined pattern, the receiver presence detector 309 may determine that the power transmitter 101 is no longer present within the operational volume of the power transfer.

As also described for the complementary scenario, the first transmitter communicator 205 may continuously transmit the predetermined pattern and the receiver presence detector 309 may continuously monitor for it. Again, as the communication is based on the power transfer signal being used as a carrier, it is a good indication of whether the power receiver and the power transmitter are sufficiently close for the power receiver to be considered to be in the power transfer operational volume.

The receiver presence detector 309 is coupled to the power receiver controller 301 and if it is detected that the power transmitter is no longer present within the proximity of the receiver coil 107 (by suitable data not being received), the power receiver controller 301 is informed. The power receiver controller 301 may proceed to restrict the power transfer operation. This may be done in different ways depending on the application but in many embodiments, it may be achieved by the power receiver 105 communicating data requests or commands to the power transmitter using the out-of-band communication link (which typically has a much larger range than the in-band communication link).

The power receiver 105 may for example directly transmit a command to terminate power transfer or to restrict the power levels to a given value. In other embodiments, the power receiver controller 301 may modify the transmission of control data such that this results in the desired change of the power transfer. For example, continuous power down requests may be transmitted. As another example, the power receiver controller 301 may withhold the transmission of messages that are essential for the power transfer to continue. For example, if no error control messages are transmitted, the power transmitter 101 will terminate power transfer.

Thus, in general, the described functionality may be considered to apply to a power transfer apparatus (being the power transmitter or the power receiver) for performing power transfer with a complementary power transfer apparatus (being the other of the power transmitter and the power receiver). For brevity, the description focusses on the scenario where the power transfer device comprising the detection functionality is the power transmitter and the complementary device is the power receiver but it will be appreciated that the provided comments also apply to the detection functionality being in the power receiver and the complementary device being the power transmitter. Indeed, in many embodiments, detection functionality may be implemented in both the power transmitter and the power receiver.

The description and individual comments provided thus also apply (mutatis mutandis) for the complementary setup, i.e. by exchanging the features of, and references to, the power receiver and the power transmitter as appropriate.

In many embodiments, the data used for presence detection, henceforth referred to as presence data, may specifically be an identity indication for the complementary device, i.e. for the power transmitter 101 or the power receiver 105 as appropriate. The identity indication may in some embodiments be a predetermined identity. For example, each device may at manufacturing be allocated a given data pattern and this data pattern may be transmitted as the preference data. The presence detector may in some embodiments have predetermined knowledge of the identity data pattern (e.g. the power transmitter may be designed to work with a specific power receiver) but will in most embodiments be communicated during the initialization of the power transfer. For example, when the power transfer is being initialized, the power receiver may transmit an identity data pattern (signature) to the power transmitter and the transmitter presence detector 209 may proceed to check during power transfer that it sufficiently frequently receives a data pattern from the power receiver which matches this signature. If this is not the case, whether no or a wrong data pattern is received, the power transmitter may proceed to terminate power transfer. Thus, if the power receiver is removed and quickly replaced by another power receiver, this is detected by the transmitter presence detector 209 and the power transfer is terminated, even if the power transmitter can still receive valid control data from the previous power receiver via the out-of-band communication link.

Thus, in many embodiments, the detection of an absence of the complementary device, specifically the detection of the absence of the power receiver by the transmitter presence detector 209 is based on a detection that no identity indication is received that meets a given criterion, such as that an expected data pattern is not received within a given time.

In many embodiments, the identity indication may be a temporary identity and may specifically only be designed for this specific power transfer operation. For example, during power transfer initialization, the power transmitter may assign and transmit a data signature (pattern) to the power receiver. The power receiver may then during the power transfer operation proceed to transmit the data signature at regular intervals and the transmitter presence detector 209 will continuously monitor for the data signature and terminate the power transfer if this is not received sufficiently frequently.

It will also be appreciated that in many embodiments, identities may be transferred in both directions and both devices may monitor to ensure that the appropriate identity indications are received. Thus, in many embodiments, during the power transfer, identity data may be communicated bi-directionally using the in-band communication link and the continuing of the power transfer may be dependent on the correct identity data being received at both devices.

Specifically, prior to the power transfer starting, the power transmitter and power receiver may exchange a TXID and a RXID. During power transfer, the power transmitter will transmit the TXID and the power receiver will transmit the RXID via the in-band communication link. Then, if the wireless power transmitter identifies a wrong (unauthorized) wireless power receiver in the wireless power operational volume (wrong RXID) or it does not identify any wireless power receiver in the wireless power operational volume (no RXID), it will terminate power delivery. Similarly, if the power receiver identifies a wrong wireless power transmitter in the operational volume (wrong TXID), it can report this to the power transmitter with which the power transfer was initialized and this may then proceed to terminate the power transfer.

It will be appreciated that different presence data and identity indications may be used in different embodiments, including for example an out-of-band communication link MAC address, a CRC or other data sequence, etc.

In some embodiments, the data exchange may use a request and response format whereby the message performing the detection can initiate and control the communication. For example, the transmitter presence detector 209 may determine that it is time for a presence test (e.g. at regular intervals) and it may initiate the first transmitter communicator 205 to transmit a query message to the power receiver requesting a response. For example, a simple pattern corresponding to a request for a power receiver identity to be transmitted may be requested. In response the power receiver may proceed to transmit a response message.

In such a case, if the transmitter presence detector 209 receives a valid response (e.g. a suitable identity indication), within a given duration, it may determine that the power receiver is still present. However, if no acceptable response message is received, the transmitter presence detector 209 will determine that an absence of the power receiver is detected and it will proceed to control the power transmitter controller 203 to terminate power transfer.

An advantage of such an approach is that presence detection need only be performed in one device, typically the power transmitter, yet a presence is only detected if in-band communication between the power transmitter and the power receiver is possible in both directions.

In many embodiments, the out-of-band communication link may be used for communicating control data for the power transfer as previously described whereas the in-band communication link is used only for communicating data for the presence detection, such as e.g. only identification data. However, in some embodiments, the system may be arranged to distribute the control data communication over the in-band communication link and the out-of-band communication link, and thus both communication approaches may be used for the communication of control data.

This may provide particular advantages in many scenarios. Specifically, the out-of-band communication link may provide a high maximum data rate and therefore may be suitable for supporting control data that has a high data rate. However, despite having a high data rate, many out-of-band communication links tend to be associated with a higher communication delay than the in-band communication link. Indeed, in many embodiments, the in-band communication link may be characterized by supporting a lower data rate than the out-of-band communication link but also having a substantially lower data rate. Accordingly, the in-band communication link may in some embodiments be used specifically for delay sensitive control data whereas the out-of-band communication link is used for high data rate control data.

As an example, low latency in-band communication link may be utilized for time-critical control data, this data can indicate immediate action requested by power receiver such as adjusting power to negotiated level or immediate stop of power transfer. Out-of-band communication link might be utilized to negotiate exact power levels or absolute power mismatch, provide user with interface to control power transfer or to negotiate other auxiliary data not directly related to power transfer.

In many embodiments, the presence detection may also be based on data that is control data communicated on the in-band communication link. For example, if the transmitter presence detector 209 detects that valid power control messages are received sufficiently frequently over the in-band communication link, it may be considered that a power receiver is indeed present. However, if the transmitter presence detector 209 detects that power control messages are not received, it may consider that an absence of the power receiver has been detected.

In some embodiments, the power transfer signal is subject to a repeating time frame which comprises at least one power transfer time interval and one reduced power time interval. During the power transfer phase, a repeating time frame is applied on the power transfer signal.

The power level of the power transfer signal is reduced during the reduced power time interval relative to the power transfer time interval, and typically the maximum allowable power is no less than 5, 10, or 50 times lower than the power level during the reduced power time interval than during the power transfer time interval. The reduction in the power level may result from actions at the power transmitter and/or at the power receiver. For example, in some embodiments, the power transmitter may be arranged to switch off the power transfer signal during the reduced power time interval and/or the power receiver may be arranged to disconnect the load during the reduced power time interval.

The power transmitter and/or the power receiver are arranged to perform the communication of the presence data during the reduced power time intervals. The communication of the presence data is an in-band communication and uses the power transfer signal as a communication carrier. The power level of the power transfer signal is accordingly not set to zero during the reduced power time intervals but rather a lower value of the power level is set.

Typically, the power level of the power transfer signal is further set to be a constant, fixed value during the reduced power time intervals. In some embodiments, the power level during the reduced power time intervals is set to a fixed, constant, predetermined value but in some embodiments the power level may be adapted. However, in most embodiments, this adaptation will be very slow and the power level can be considered constant for at least some consecutive reduced power time intervals.

Thus, the power transfer signal is typically set to a fixed non-zero amplitude/power level in a plurality of subsequent reduced power time intervals. The power level is further reduced compared to the power levels that may be applied outside the reduced power time intervals, and specifically the maximum power level may be reduced during the reduced power time intervals relative to the power transfer signals.

Figure 4:
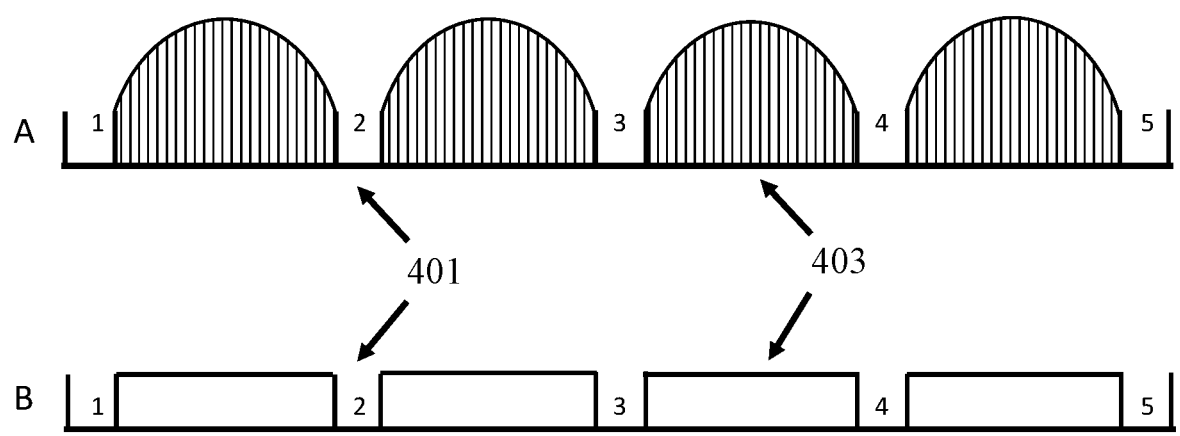
FIG. 4 illustrates an example of elements of an apparatus in accordance with some embodiments of the invention.

FIG. 4 illustrates an example of the operation using a repeating time frame. FIG. 4 shows the amplitude of the power transfer signal during reduced power time intervals 401 and during power transfer intervals 403 for an example A where the power level varies during the power transfer intervals and for an example B where the power level is constant during the power transfer time intervals 403.

In many embodiments, the voltage supply provided to the driver/inverter 201 is generated directly from a mains voltage without any voltage regulation or smoothing (but possibly with some rectification) and thus may in practice often by a sinusoidal or a rectified sinusoidal supply voltage. Typically, this has a relatively low frequency of 50 Hz or 60 Hz (or double that if rectification is applied) and the driver generates the higher frequency drive signal from this supply voltage. The amplitude/power level of the higher frequency drive signal accordingly varies with the supply voltage signal as shown in FIG. 4.

In such a case, the reduced power time intervals may be synchronized to the variations in the power/amplitude level and specifically may be synchronized to occur around the minima thereof, typically corresponding to the zero crossings of the supply voltage to the driver.

This may provide improved performance and may specifically optimize the power transfer performance by minimizing the impact on the power transfer of introducing these reduced power time intervals.

It should be noted that FIG. 4 shows the power levels during the power transfer time intervals and indicates that the power level during the reduced power time intervals is reduced in comparison therewith. However, as mentioned the power transfer signal is not switched off and the power level is not set to zero. Rather, it is set to some lower, often predetermined, value.

The presence data is then communicated during the reduced power time intervals and thus is communicated during the times when the power transfer signal may be set to a constant predetermined level. This may ensure more reliable communication and may reduce the impact on the power transfer operation of modulating the power transfer signal. Further, it allows for a more reliable and robust operation and presence detection.

Indeed, the reduced power level may reduce the communication range as the communication carrier power is reduced accordingly. This may ensure that if the presence data can be successfully communicated then the power receiver and the power transmitter are sufficiently close for secure power transfer. Indeed, the power level during the reduced power time intervals may be selected specifically to provide a desired communication range for the presence data.

The approach may reflect the realization that for higher power levels, in-band communication is not reliable or may cause unacceptable power losses. For a driver based on an AC-mains power supply, modulation of the power carrier may be performed near the mains zero crossings where the transferred power level is sufficiently low. During power transfer/power transfer phase, the power transmitter may operate in two modes: a main mode (high-power delivery mode) and a low-power delivery mode, corresponding to the power transfer time intervals and reduced power time intervals respectively.

Specifically, the wireless power transmitter may periodically stop the main power delivery for short interval of time (the reduced power time intervals). During this slot, the wireless power transmitter provides a lower power to the wireless power receiver. During the low power carrier delivery, the wireless power transmitter and the wireless power receiver can exchange data (e.g. RXID and/or TXID) through modulation of low power carrier.

In some embodiments, the power transmitter 101 may be arranged to not only change the power level but also the frequency during the reduced power time intervals. Specifically, it may be arranged to increase the frequency of the power transfer signal such that this is higher during reduced power time intervals than during power transfer time intervals. For example, during power transfer, the frequency of the power transfer signal may for example be 100 kHz but during the reduced power time intervals this may be increased to 150 kHz.

This higher frequency may be less suitable for the power transfer but may allow improved communication. For example, it may allow a higher bandwidth and thus a higher communication data rate. This may be particularly significant for a slotted operation as communication may only be performed in the reduced power time intervals rather than for the full duration. Thus, the average communication rate may be substantially lower than the instantaneous data rate during the reduced power time intervals and it is therefore important to seek to maximize this.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

Not every main power signal slot might be used for proximity tracking. The given solution opens a possibility to use only some (for example every second power slot) slots to deliver low power and detect proximity, other slots might be used for foreign object detection or other purpose. The size of slot for main power to be interrupted and interval between two slots might be pre-programmed static values by the wireless power transmitter, pre-programmed static values in wireless-power receiver or values negotiated between wireless power receiver and wireless power transmitter through commination channel. One should take into account the tradeoff between slot size, slot occurrence frequency and main power interruption—too long interval between slots increases a risk, at the same time, slot size should be sufficient for at least some communication using the low power carrier. For wireless power systems with AC mains transferred, it does make sense to interrupt power delivery near the zero crossing of AC mains to reduce the power losses. FIG. 4 demonstrates time diagram of alternating main and low power delivery, both for AC mains and DC case.

To keep the slot size short it is possible to split to ID transmission over several slots. It increases the system response time, but reduces the level of power transferred in the AC mains case and reduces the power gap in DC case.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

There May be Provided:

A power transfer apparatus for wireless power transfer from a power transmitter (101) to a power receiver (103), the power transfer apparatus being one of the power transmitter and the power receiver, the power transfer apparatus comprising:
- a power transfer coil (103, 107) for transferring power with a complementary power transfer coil (107, 103) of a complementary power transfer apparatus via a power transfer signal, the complementary power transfer apparatus being the other of the power transmitter (101) and the power receiver (105);
- a first communicator (205, 305) for communicating first data with the complementary power transfer apparatus via a first communication channel using modulation of the power transfer signal;
- a second communicator (207, 307) for communicating power transfer control data with the complementary power transfer apparatus via a second communication channel being independent of the power transfer signal, wherein a communication data rate for the second communication channel is no less than ten times higher than a communication data rate for the first communication channel;
- a presence detector (209, 309) for determining whether the complementary power transfer apparatus is present in a proximity of the power transfer coil (103, 107) in response to the first data; and
- a power transfer controller (201, 301) arranged to restrict the wireless power transfer from the power transmitter (101) to the power receiver (103) in response to a detection of an absence of the complementary power transfer apparatus.

A method of operation for a power transfer apparatus for wireless power transfer from a power transmitter (101) to a power receiver (103), the power transfer apparatus being one of the power transmitter and the power receiver, the method comprising:
- a power transfer coil (103, 107) transferring power with a complementary power transfer coil (107, 103) of a complementary power transfer apparatus via a power transfer signal, the complementary power transfer apparatus being the other of the power transmitter (101) and the power receiver (105);
- communicating first data with the complementary power transfer apparatus via a first communication channel using modulation of the power transfer signal;
- communicating power transfer control data with the complementary power transfer apparatus via a second communication channel being independent of the power transfer signal, wherein a communication data rate for the second communication channel is no less than ten times higher than a communication data rate for the first communication channel;
- determining whether the complementary power transfer apparatus is present in a proximity of the power transfer coil (103, 107) in response to the first data; and
- restricting the wireless power transfer from the power transmitter (101) to the power receiver (103) in response to a detection of an absence of the complementary power transfer apparatus.

A power transfer system for wireless power transfer from a power transmitter (101) to a power receiver (103),
the power transmitter (101) comprising:
- a power transmitter coil (103) for generating a power transfer signal for transferring power to the power receiver (105),
- a first transmitter communicator (205) for communicating first data with the power receiver (105) via a first communication channel using modulation of the power transfer signal, and
- a second transmitter communicator (207) for communicating power transfer control data with the complementary power transfer apparatus via a second communication channel being independent of the power transfer signal, wherein a communication data rate for the second communication channel is no less than ten times higher than a communication data rate for the first communication channel; and the power receiver (103) comprising:
- a power receiver coil (107) for receiving power via the power transfer signal,
- a first receiver communicator (305) for communicating the first data with the power receiver (105) via the first communication channel, and
- a second receiver communicator (307) for communicating the power transfer control data with the power transmitter (101) via the second communication channel; wherein at least one of the power transmitter (101) and the power receiver (103) further comprises:
- a presence detector (209, 309) for determining whether the complementary power transfer apparatus is present in a proximity of the power transfer coil (103, 107) in response to the first data, the complementary power transfer apparatus being the other of the at least one of the power transmitter (101) and the power receiver (103); and
- a power transfer controller (201, 301) arranged to restrict the wireless power transfer from the power transmitter (101) to the power receiver (103) in response to a detection of an absence of the complementary power transfer apparatus.

The invention claimed is:

1. A power receiver comprising:
a power transfer coil, wherein the power transfer coil is arranged to receive power from a power transmitter using a power transfer signal;
a first communicator circuit,
   wherein the first communicator circuit is configured to transmit first data to the power transmitter using a first communication channel,
   wherein the first communication channel utilizes modulation of the power transfer signal; and
a second communicator circuit,
   wherein the second communicator circuit is configured to transmit power transfer control data to the power transmitter using a second communication channel,
   wherein the second communication channel is independent of the power transfer signal;
wherein the wireless power transfer is restricted in response to failing to detect the power receiver in proximity to the power transmitter,
wherein proximity is determined using the first data,
wherein the power transfer signal uses a repeating time frame,
wherein the repeating time frame comprises at least one power transfer time interval and at least one reduced power time interval,
wherein a power level of the power transfer signal is reduced during the at least one reduced power time interval,
wherein the reduction of power during the reduced time interval is relative to the power transfer during the at least one power transfer time interval, wherein the first communicator circuit is arranged to transmit the first data during the at least one reduced power time interval.

2. The power receiver of claim 1, wherein the wireless power transfer is restricted when none of the first data meets a criterion.

3. The power receiver of claim 1,
wherein the first data comprises an identity indication for the power receiver,
wherein the wireless power transfer is restricted when none of the identity indication meets a criterion.

4. The power receiver of claim 1,
wherein the first communicator circuit is arranged to receive a query message to the power receiver,
wherein the power receiver is arranged to respond to the query message with the first data,
wherein the wireless power transfer is restricted if none of the first data comprises a valid response to the query message.

5. The power receiver of claim 1, wherein the first data comprises second control data for the power transfer.

6. The power receiver of claim 1, further comprising a power controller circuit,
wherein the power controller circuit is configured transmit the power transfer control data to the power transmitter,
wherein the power controller circuit is configured to transmit a first portion of the power transfer control data using the first communication channel,
wherein the power controller circuit is configured to receive a second portion of the power transfer control data using the second communication channel.

7. The power receiver of claim 1, wherein the power transfer signal has a fixed non-zero amplitude during at the least one reduced power time interval.

8. The power receiver of claim 1, wherein a frequency of the power transfer signal is higher during the at least one reduced power time interval than during the at least one power transfer time interval.

9. A method of operation for a power receiver comprising:
receiving power from a power transmitter using a power transfer coil via a power transfer signal;
transmitting first data to the power transmitter using a first communication channel, wherein the first communication channel utilizes modulation of the power transfer signal;
transmitting power transfer control data to the power transmitter using via a second communication channel, wherein the second communication channel is independent of the power transfer signal;
wherein the wireless power transfer is restricted in response to a detection of the absence of the power receiver,
wherein the power transfer signal uses a repeating time frame,
wherein the repeating time frame comprises at least one power transfer time interval and at least one reduced power time interval,
wherein a power level of the power transfer signal is reduced during the at least one reduced power time interval,
wherein the reduction of power during the reduced time interval is relative to the power transfer during power transfer time interval,
wherein the first communicator circuit is arranged to transmit the first data during the at least one reduced power time interval.

10. The method of claim 9, wherein the transmitter is configured to restrict the wireless power transfer when none of the first data meets a criterion.

11. The method of claim 9,
wherein the first data comprises an identity indication for the power receiver,
wherein the wireless power transfer is restricted based on the failure of the identity indication to meet a criterion.

12. The method of claim 11, further comprising receiving a query message from the power transmitter, wherein the wireless power transfer is restricted based on the first data failing to comprise a valid response to the query message.

13. The method of claim 9, wherein the first data comprises second control data for the power transfer.

14. The method of claim 9, further comprising:
transmitting a first portion of the power transfer control data using the first communication channel,
transmitting a second portion of the power transfer control data using the second communication channel.

15. The method of claim 9, wherein the power transfer signal has a fixed non-zero amplitude during at the least one reduced power time interval.

16. The method of claim 9, wherein a frequency of the power transfer signal is higher during the at least one reduced power time interval than during power transfer time interval.

17. A computer program stored on a non-transitory medium, wherein the computer program when executed on a processor performs the method as claimed in claim 9.

* * * * *